INVENTOR:
J. ROGER HITE
BY Louis J. Bovasso
HIS ATTORNEY

United States Patent Office 3,538,200
Patented Nov. 3, 1970

3,538,200
METHOD FOR PRILLING MOLTEN SULFUR
Joe Roger Hite, Oakland, Calif., assignor to Shell Oil Company, New York, N.Y., a corporation of Delaware
Filed Dec. 26, 1968, Ser. No. 787,066
Int. Cl. B01j 2/04, 2/06
U.S. Cl. 264—13                                   5 Claims

ABSTRACT OF THE DISCLOSURE

A method for converting solid sulfur into substantially spherical particles by passing molten sulfur through a cooling medium and removing the molten sulfur from the cooling medium in the form of partially cooled, substantially spherical sulfur particles before the particles lose all their residual sensible heat. The partially cooled particles are dried using solely the residual sensible heat left therein.

BACKGROUND OF THE INVENTION

Field of the invention

This invention relates to a method for prilling sulfur. More particularly, this invention relates to a method for changing liquid sulfur into substantially spherical hardened beads or prills.

DESCRIPTION OF THE PRIOR ART

Sulfur may be applied in several forms. One of the chief uses of sulfur is in the making of sulfuric acid which is useful in a wide variety of industries.

There are at least three general processes by which sulfur particles (referred to as "prills") are currently made in commercial process:

(i) By agglomeration of atomized sulfur on larger particles in fluid or moving beds. An example of this is the "Perlomatic" process by Potasse et Engrais Chimiques in which moist air and atomized sulfur enter through the bottom of a semi-fluidized bed of sulfur pellets. The fresh sulfur forms successive coats on the growing pellets which overflow from the top of the bed as product. Disadvantages to this process are the large build-up of growing pellets, the inherently slow flow rates, the risk of explosion in the hot sulfur-air mixture, and the need for product sizing and recirculation of fines and oversize. The advantages, however, are that a very compact, high density prill is produced, virtually free of water.

(ii) By balling in a tank of swirling water. In a process by Elliott Associated Developments, Ltd., molten sulfur is introduced at the top of a cylindrical vessel of swirling water. As the sulfur moves downward in a spinning helical path, the balance of agglometration and disruptive inertial forces produces a fairly uniform size of sulfur prills. The product, after drying to 0.5 wt. percent water, is claimed to be capable of withstanding pneumatic and mechanical handling. One disadvantage to the Elliott process is that the product is generally not spherical, but typically contains dimples or surface cavities which make the prill more friable and more difficult to dry.

(iii) By Rayleigh breakup of low velocity jets. The breakup of low velocity streams of liquid into uniform drops was first investigated by Lord Rayleigh as far back as 1878. This phenomenon, which now bears his name, is caused by inertial and surface tension forces which cause small surface disturbances to grow and amplify until the liquid stream is broken up. The resultant drop sizes are very uniform and can easily be controlled by selecting the proper jet diameter and flow rate. Rayleigh breakup for prill formation is covered by several U.S. Patents such as U.S. Pat. Nos. 3,060,510 and 2,510,574, and is the basis of the "Horton Thermaprill Process."

After the drops have formed, heat is removed by free fall through air, through a liquid bath, or through a spray of cooling liquid. Such prior art processes require a significant amount of water for cooling and heat for drying.

SUMMARY OF THE INVENTION

An object of this invention is to provide a method for producing prilled sulfur wherein the size of the prills can be controlled.

A yet further object is to produce prilled sulfur particles free of fine particles, resistant to breakage and easier to handle or transport than other forms of solid sulfur.

These objects are carried out by passing molten sulfur through a cooling medium and removing the molten sulfur from the cooling medium in the form of partially cooled, substantially spherical sulfur particles before the particles lose all their residual sensible heat. The partially cooled particles are dried using solely the residual sensible heat left therein. The dried prilled sulfur particles may be conveniently shipped without the danger of attrition or damage of any kind.

DESCRIPTION OF THE PREFERRED EMBODIMENTS

Figure 1:
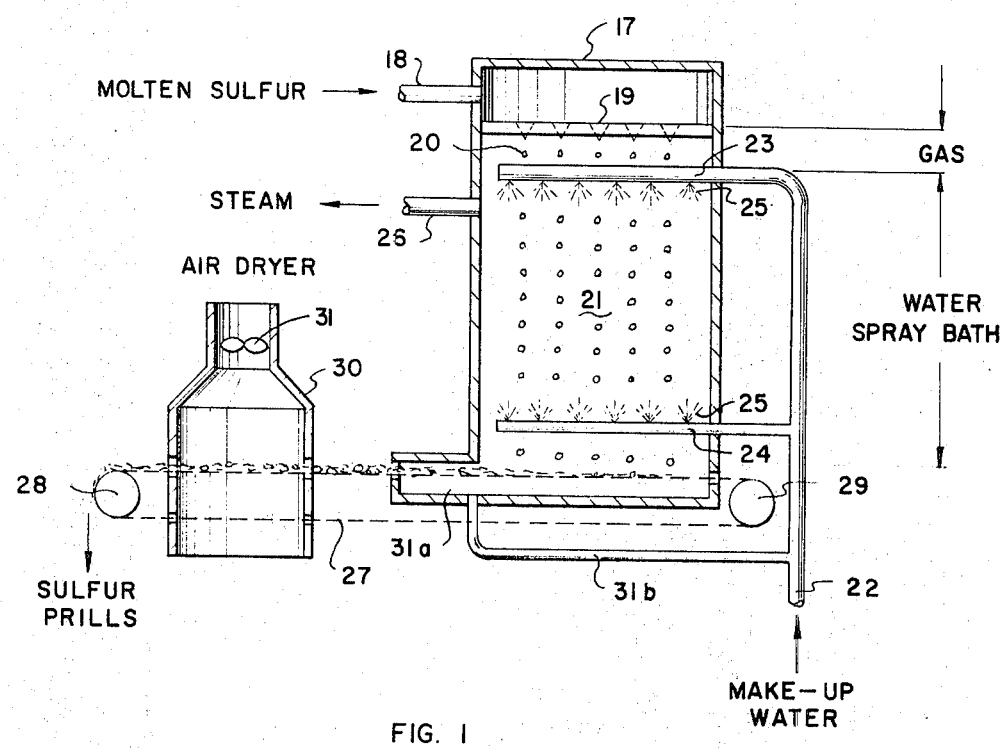
FIG. 1 is a vertical sectional view of a prilling tower for carrying out the teachings of my invention.
Figure 2:
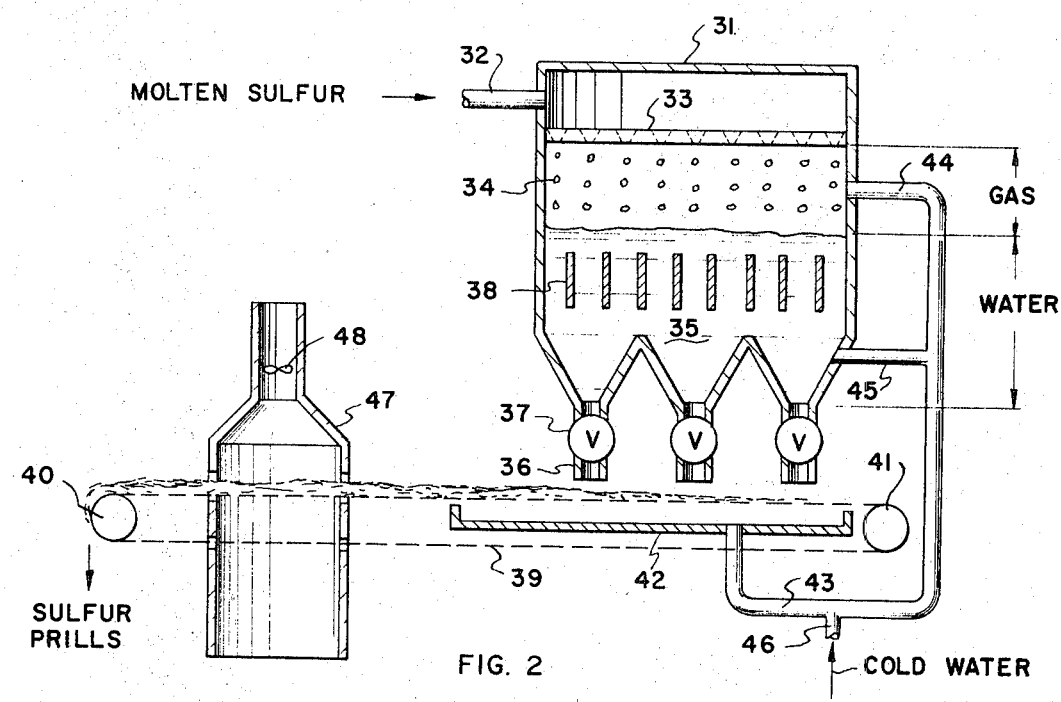
FIG. 2 is a vertical sectional view of an alternate prilling tower for carrying out my invention.

Referring to the drawing, FIGS. 1 and 2 show sulfur prilling towers in accordance with the teachings of my invention. In FIG. 1, the molten sulfur is introduced into the sulfur prilling tower 17 at inlet 18 and dispersed through the sieve plate 19 into a gaseous atmosphere composed of air and steam. Jets of molten sulfur, issuing, from beneath the orifices of the sieve plate 19, are broken up through the action of surface tension and inertial forces into uniformly-sized droplets. These droplets are then partially cooled (i.e., below the melting point of sulfur, but not to atmospheric temperature) as they fall through water mists 25 located throughout the zone 21. The water mists are formed by spray nozzles 25 from make-up water 22 and recycle water 31b which is introduced into tower 17 through inlets 23 and 24. Steam may be removed from tower 17 at steam outlet 26.

A porous endless belts 27, controlled by a pair of horizontally disposed rollers 28 and 29 driven by any conventional motive means (not shown), is in communication with the sulfur prills 20 so that the prills are removed from tower 17 at the bottom thereof in accordance with the teachings of this invention. Water preferably passes through belt 27 into trough 31a where it is recycled from branch portion 31b back into the spray nozzles 25. Thus, prills 20 are removed from the cooling zone 21 while the prills 20 retain a large amount of residual sensible heat, preferably after no more than approximately 75% of the sensibile heat has been removed in the cooling zone 21.

The prills 20 may be passed through an air dryer 30 where residual steam and humidity are removed from the vicinity of the prills 20 by a stream of air blown through the prills by the air fan 31. Having passed through air dryer 30, the prills 20 leave the porous belt 27 and are ready for storage or transport. A prilling process using spray cooling as illustrated in FIG. 1 permits operation at atmospheric pressure within prilling tower 17 and allows minimum water recycle. Because of the large difference in latent heats, the latent heat of sulfur may be removed by evaporating water at a water-to-sulfur ratio of only 0.03. Such a low ratio means reduced pumping and cooling loads for recycled water and reduced corrosion problems. A distinct advantage of spray cooling is that the entire operation takes place at atmospheric pressure, thus eliminating the need for pressure locks with the associated attrition of sulfur prills.

In FIG. 2, the molten sulfur is introduced into sulfur prilling tower 31 through inlet 32. The molten sulfur is dispersed by disperser 33, similar to disperser 19 above, into a gaseous atmosphere below disperser 33, then into cooling bath 35 to exit out of funnels 36. Flow through funnels 36 may be controlled by valve means 37 so as to maintain a sufficient pressure in vessel 35.

A plurality of vertical guide plates 38 may be disposed in cooling bath 35, if desired. The prills 34 from funnels 36 are deposited onto porous endless belt 39, controlled by a pair of horizontally disposed rollers 40 and 41 respectively. Water removed from bath 35 passes through belt 39 into a trough 42 where the water preferably passes into a water recycle line 43 for re-circulation back into cooling bath 35 through water inlets 44 and 45, respectively. Cold water from an external source (not shown) may be flowed into recycle line 43 through cold water inlet 46 to cool line 43. The prills 34 pass through an air dryer 47 having vane means 48 therein for removing residual humidity from prills 34. Belt 39 may be driven by any conventional motive means (not shown).

The bath cooling process of FIG. 2 provides even and certain cooling for every sulfur prill. Careful control of heat removal in bath 35 requires that the bath temperature be preferably well regulated and the sulfur preferably moved through bath 35 in plug flow so that each prill 34 experiences about the same residence time in bath 35. Too much cooling may produce a prill incapable of drying itself; too little cooling risks agglomeration of drops with too thin solid shells.

The pressure inside bath 35 must exceed the vapor pressure of water at the temperature of the molten sulfur. At lower pressures, possible boiling upon initial contact of sulfur and water at the water surface may momentarily "float" the sulfur droplet. Such a holdup or delay on the water surface creates the undesirable possibility of coalescence with following sulfur prills. Preferably, then, pressure lock devices 37 may be disposed at the exit of the prilling tower 31. Such devices may be adapted to remove a sulfur water slurry from tower 31 at a controlled rate without causing appreciable attrition.

I claim as my invention:
1. A method of prilling molten sulfur, comprising:
 (a) breaking up a stream of molten sulfur into a plurality of substantially uniformly sized droplets,
 (b) passing said droplets first through a cooling gaseous atmosphere and then through an aqueous cooling bath to cool said droplets below their melting point to form prills thereof, with residual sensible heat within said prills,
 (c) removing said prills from said cooling atmosphere and bath while said prills retain a large amount of residual sensible heat therein, and
 (d) drying said prills using solely the residual sensible heat within said prills.
2. The method of claim 1 wherein the step of passing said droplets of molten sulfur through an aqueous cooling bath includes the step of spraying said droplets of molten sulfur with water having a lower temperature than said sulfur.
3. The method of claim 1 wherein the step of passing said droplets of molten sulfur through an aqueous cooling bath includes the step of passing said droplets of molten sulfur through a bath of water having a lower temperature than said sulfur.
4. The method of claim 1 wherein the step of removing said droplets of molten sulfur from the cooling medium includes the step of maintaining said droplets of molten sulfur in the cooling medium until no more than about 75% of the sensible heat present in said droplets has been removed.
5. The method of claim 1 wherein the step of breaking up the stream of molten sulfur into a plurality of droplets includes the step of flowing said stream through a plurality of orifices adapted to form said droplets.

References Cited
UNITED STATES PATENTS

| | | | |
|---|---|---|---|
| 2,811,748 | 11/1957 | Smith | 264—13 |
| 3,334,159 | 8/1967 | Campbell | 264—13 |

ROBERT F. WHITE, Primary Examiner

J. R. HALL, Assistant Examiner